United States Patent [19]
Dedhia

[11] Patent Number: 5,880,986
[45] Date of Patent: Mar. 9, 1999

[54] METHOD AND APPARATUS FOR REDUCING POWER USAGE WITHIN A DOMINO LOGIC UNIT

[75] Inventor: Aatish Dedhia, Portland, Oreg.

[73] Assignee: Intel Corporation, Santa Clara, Calif.

[21] Appl. No.: 857,087

[22] Filed: May 15, 1997

Related U.S. Application Data

[62] Division of Ser. No. 581,062, Dec. 29, 1995.

[51] Int. Cl.$^6$ .................................. G06F 7/50; G06F 1/00
[52] U.S. Cl. ........................................ 364/784.05; 364/707
[58] Field of Search ........................ 364/784.05, 784.01, 364/707, 768, 784.02, 784.03, 784.04, 786.01, 786.02

[56] References Cited

U.S. PATENT DOCUMENTS

| | | | |
|---|---|---|---|
| 5,208,489 | 5/1993 | Houston | 307/451 |
| 5,406,506 | 4/1995 | Jiasheng et al. | 364/784 |
| 5,483,181 | 1/1996 | D'Souza | 326/98 |
| 5,487,025 | 1/1996 | Partovi et al. | 364/788 |
| 5,612,638 | 3/1997 | Lev | 326/98 |

OTHER PUBLICATIONS

A 200–MHz CMOS Pipelined Multiplier–Accumulator Using a Quasi–Domino Dynamic Full–Adder Cell Design—Fang Lu and Henry Samueli, IEEE Journal of Solid–State Circuits, vol. 28, No. 2, Feb. 1993, pp. 123–132.

BiCMOS Dynamic Full Adder Circuit for High–Speed Parallel Multipliers H.P. Chen, H.J. Liao and J.B. Kuo, Electronics Letters 4th Jun. 1992 vol. 28 No. 12,pp. 1124–1126.

A BiCMOS Dynamic Carry Lookahead Adder Circuit for VLSI Implementation of High–Speed Arithmetic Unit J.B. Kuo, H.J. Liao and J.P. Chen, IEEE Journal of Solid–State Circuit, vol. 28, No. 3, Mar. 1993, pp. 375–378.

Yuan et al., "New Domino Logic Precharged by clock and Data," Electronics Letters, vol. 29, No. 25, pp. 2188–2189.

Hashemian, "A Fast Carry Propagation Technique for Parallel Adders," IEEE Midwest Symposium–Circuits and Systems, pp. 456–459.

Dhong et al., "High Speed CMOS POS PLA using Predischarged or Array and Charge Sharing and Array," IEEE Trans. on Ckts and Sys., vol. 39, No. 8, pp. 557–564.

Lu et al., "A Bit–Level Pipelined Implementation of a CMOS Multiplier–Accumulator using a New Pipelined Full–Adder Cell Design," 1989 Int'l Conf. on Computers and Communications, pp. 49–52.

*Primary Examiner*—Chuong Dinh Ngo
*Attorney, Agent, or Firm*—Blakely, Sokoloff, Taylor & Zafman LLP

[57] ABSTRACT

Power reduction is achieved either statically or dynamically within domino logic circuits. For static power reduction, representative input signals to the logic circuit are analyzed and any variation from purely random signals is detected. The domino circuit is then configured, if possible, to utilize less power for input signals having a higher probability of being received. As an example, a domino adder circuit is configured with predischarged carry nodes, rather than precharged carry nodes, individual logic cells to exploit input signals which often include numerous leading zeros. For dynamic power reduction, actual individual input signals are analyzed to determine whether power reduction can be achieved by either selecting between two preconfigured domino circuits or by modifying the input signals prior to routing through a single domino logic circuit. In the latter case, inversion of the input signals may result in power savings. In a specific example, a domino adder is provided. The input signals are analyzed to determine the percentage of pairs of ones or zeros in the input signals. If primarily composed of zeros, the input signals are routed through a domino circuit configured with logic cells with predischarged carry nodes. If the input signals are primarily ones, the signals are inverted, then routed through the domino circuit. Method and apparatus embodiments of the invention are described.

21 Claims, 12 Drawing Sheets

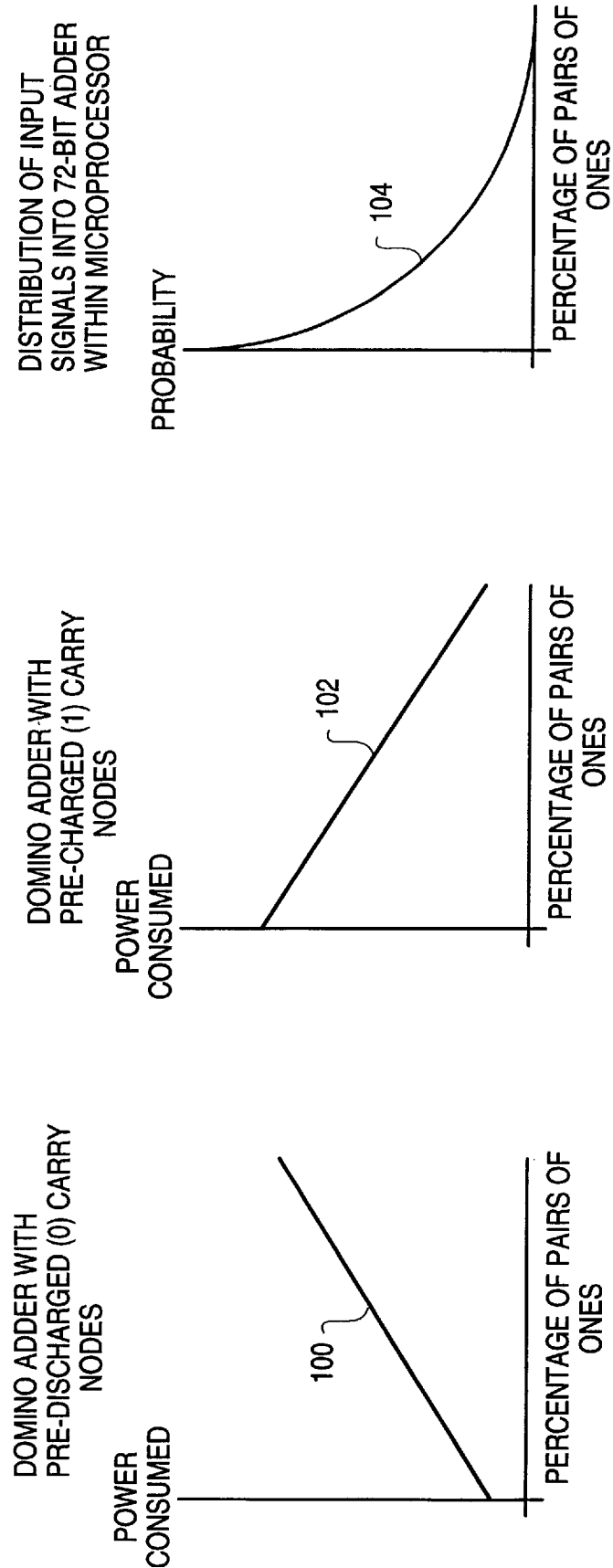

METHOD AND APPARATUS FOR REDUCING POWER USAGE WITHIN A DOMINO LOGIC UNIT

This is a divisional of application Ser. No. 08/581,062, filed Dec. 29, 1995.

BACKGROUND OF THE INVENTION

1. Field of the Invention

The invention generally relates to integrated circuits (ICs) and in particular to ICs incorporating dynamic or domino logic circuits.

2. Description of Related Art

A static CMOS gate is a fully complementary logic gate (with P and N devices configured to implement a desired logic function). A dynamic CMOS gate consists of an N-device logic structure having an output node precharged to $V_{cc}$ with a single clocked PMOS device and being conditionally discharged (evaluated) by a set of n-devices connected to $V_{ss}$.

The clocked PMOS device has a gate connected to an input clock signal. When the clock input is active, the output node is "precharged" through the PMOS device to $V_{cc}$. When the clock input is inactive, the output node is conditionally discharged (evaluated) through the N-devices to $V_{ss}$. The set of N-devices implement the logic function.

Dynamic or domino logic units are referred to as being "dynamic" because operation of the unit is controlled dynamically by the input clock signal. The logic units are typically arranged in a plurality of stages, each having logic cells such as NAND gates, NOR gates, etc., with each stage separated by an inverting stage. With this arrangement, input signals applied to the first stage while the clock signal is active trigger operation of the remaining stages in sequence yielding a domino-like signal propagation effect within the logic unit—hence, the alternative name "domino" circuit.

One of the requirements for correct operation is that during the evaluate phase, the inputs to the N-device can only change from a non-active to an active state. Otherwise, the output could be corrupted, and there is no set of PMOS devices to pull it back up. This is done by providing inverting stages which are typically provided between each logic stage to facilitate proper precharging and evaluating of the individual logic units active during the precharge phase.

FIG. 1a illustrates a domino NAND gate cell 30. (A subsequent inverting state is not shown in the figure.) As can be seen, the NAND gate stage 30 includes a single PMOS device in combination with a pair of NMOS devices. Stage 32 is a sustainer which includes an inverter and a PMOS device. The sustainer offsets any charge leakage which might occur. The domino NAND gate of FIG. 1a is referred to as an "clocked" domino gate because the input clock signal is connected to an N-device in series with N-devices of the domino logic cell. The N-devices connected to clock prevents a power path between $V_{cc}$ and $V_{ss}$ during the precharge phase.

FIG. 1b illustrates a clocked domino NOR gate cell 50 and a subsequent sustainer stage 52.

In use, dynamic or domino logic units operate in two phases—a precharged phase and an evaluate phase. During the precharged phase, logic cells of the domino circuit are precharged. During the evaluate phase, input signals are applied to the inputs of each of the logic cells and the clock signals is activated. Depending upon the inputs, some of the logic cells of the domino circuit may need to discharge to pull the output line of the logic cell from high to low, thereby sinking current from the power supply. Other logic cells, however, within the domino circuit may not need to discharge and therefore will not sink significant current. Consider, for example, an AND circuit configured using domino circuitry. If the AND gate is precharged to provide a default output logic value of 1, and the input values are (0 0), (0 1) or (1 0), the AND gate will need to discharge the output line to pull the output line from logic 1 down to logic 0, thereby drawing significant power. If, however, the input values are (1 1), then the output line need not be discharged and it will retain its precharge value and no significant amount of power is drawn by the AND gate. Similar principles apply to other logic cells such as OR gates, NOR gates and NAND gates.

Thus, the actual power drawn within a domino circuit during each evaluation phase depends upon the input signals received during the evaluation phase. In designing domino circuits, it is generally assumed that individual binary value input signals will be distributed more or less at random over a period of time. Moreover, for a complex domino circuit incorporating numerous logic cells, it is generally assumed that about half of the cells will need to be discharged during each evaluation phase. Accordingly, the average power requirements for a complex domino circuit are typically determined by assuming that half of the logic cells of the circuit will need to discharge during each evaluation phase.

A domino logic unit has the advantage over conventional static CMOS logic units in that less overall circuit space is required than a static CMOS circuit because only a single PMOS device is required within each logic cell containing a set of NMOS devices. This represents a significant savings in circuit space over static CMOS circuits which require a PMOS device for each NMOS device. Domino CMOS circuits are also often significantly faster in operation than static CMOS circuits.

A significant disadvantage, however, of domino logic circuits over static CMOS logic circuits is that considerably more power is consumed by the domino device, despite the presence of the clocked PMOS transistors. A static CMOS circuit switches at most only once a cycle. Also, within a static CMOS logic circuit (having a path between $V_{cc}$ and $V_{ss}$) power is only drawn by each logic cell (requiring a logic transition) only during the time it takes for the complimentary PMOS and NMOS devices of the cell to switch states which is typically very quick. A domino circuit consumes more power because it can switch twice every cycle, once during precharge and once during evaluate. Also, a domino circuit has a path between $V_{cc}$ and $V_{ss}$ for the period where the clock overlaps with the inputs resulting throughout power spent in that period.

Largely because of the generally higher power requirements of the domino circuit over a CMOS circuit, domino circuits are not widely employed within state of the art integrated circuits. Accordingly, it would be desirable to provide an improved method for implementing domino circuits which reduces the amount of power required by the domino circuit thereby yielding a domino circuit providing a more practical alternative to a CMOS circuit. It is to that end of the aspects of the invention are drawn.

SUMMARY OF THE INVENTION

An adder circuit to add a pair of binary numbers is described. The adder circuit includes an analyzer to determine a number of pairs of zeros and a number of pairs of ones to be added within the pair of binary numbers. The adder circuit further includes a selection unit to select the pair of binary numbers and a carry value if the number of pairs of zeros are greater than the number of pairs of ones, and to select an inverse of the binary numbers and an inverse of the carry value otherwise. The adder circuit further includes a domino adder to add the selected values together to yield an intermediate sum. An inverter inverts the intermediate sum if the inverted binary numbers were selected.

BRIEF DESCRIPTION OF THE DRAWINGS

FIG. 2a is a graph illustrating power consumption within a domino logic circuit as a function of the percentage of binary ones within input signals processed by the circuit for a domino logic circuit having all logic cells precharged.

FIG. 2b is a graph illustrating power consumption within a domino logic circuit as a function of the percentage of binary ones within input signals processed by the circuit for a domino logic circuit having all logic cells predischarged.

FIG. 2c is a graph illustrating a distribution of input signals into an adder.

DETAILED DESCRIPTION

Figure 1A:
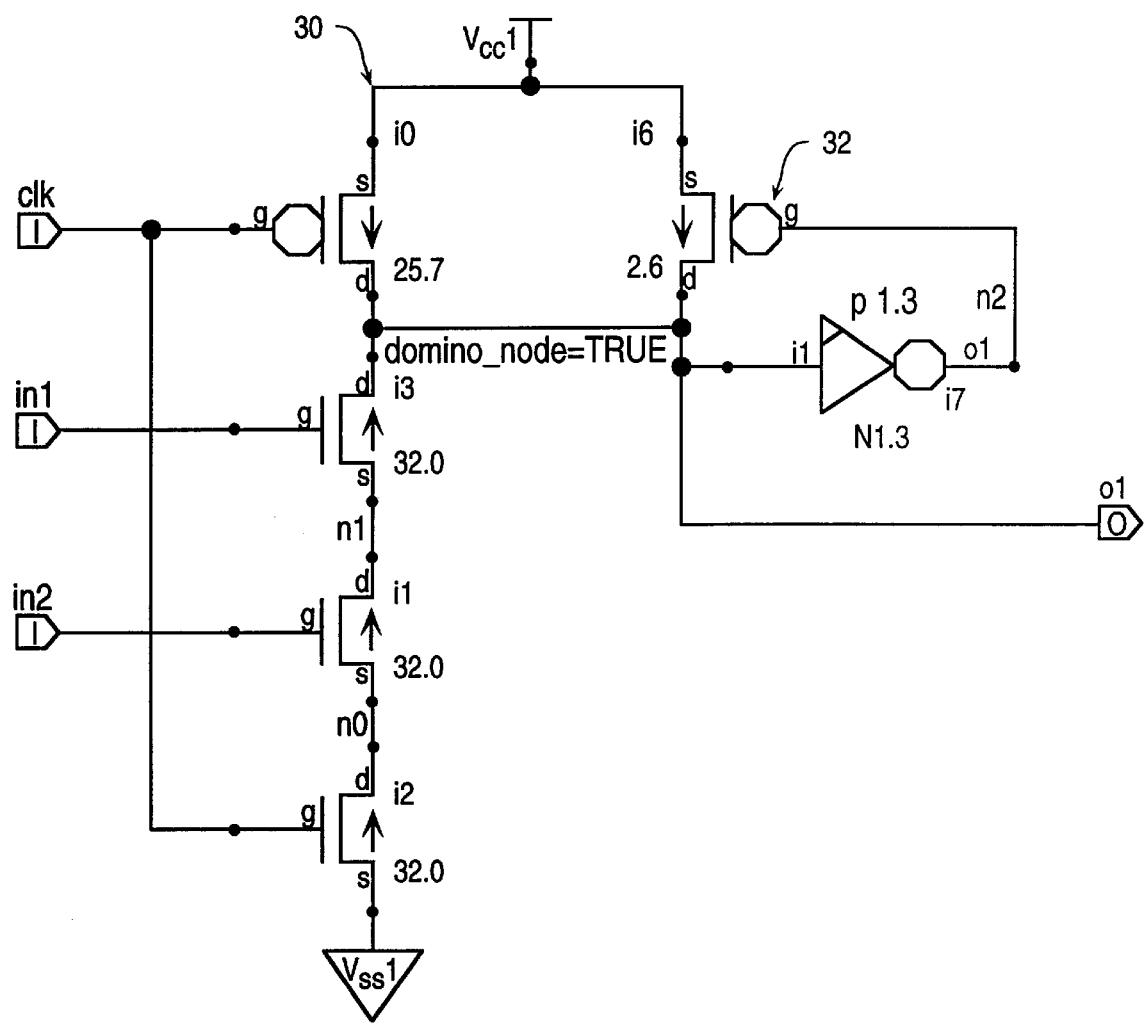
FIG. 1a is a circuit schematic of a clocked domino logic NAND gate configured in accordance with the prior art.
Figure 1B:
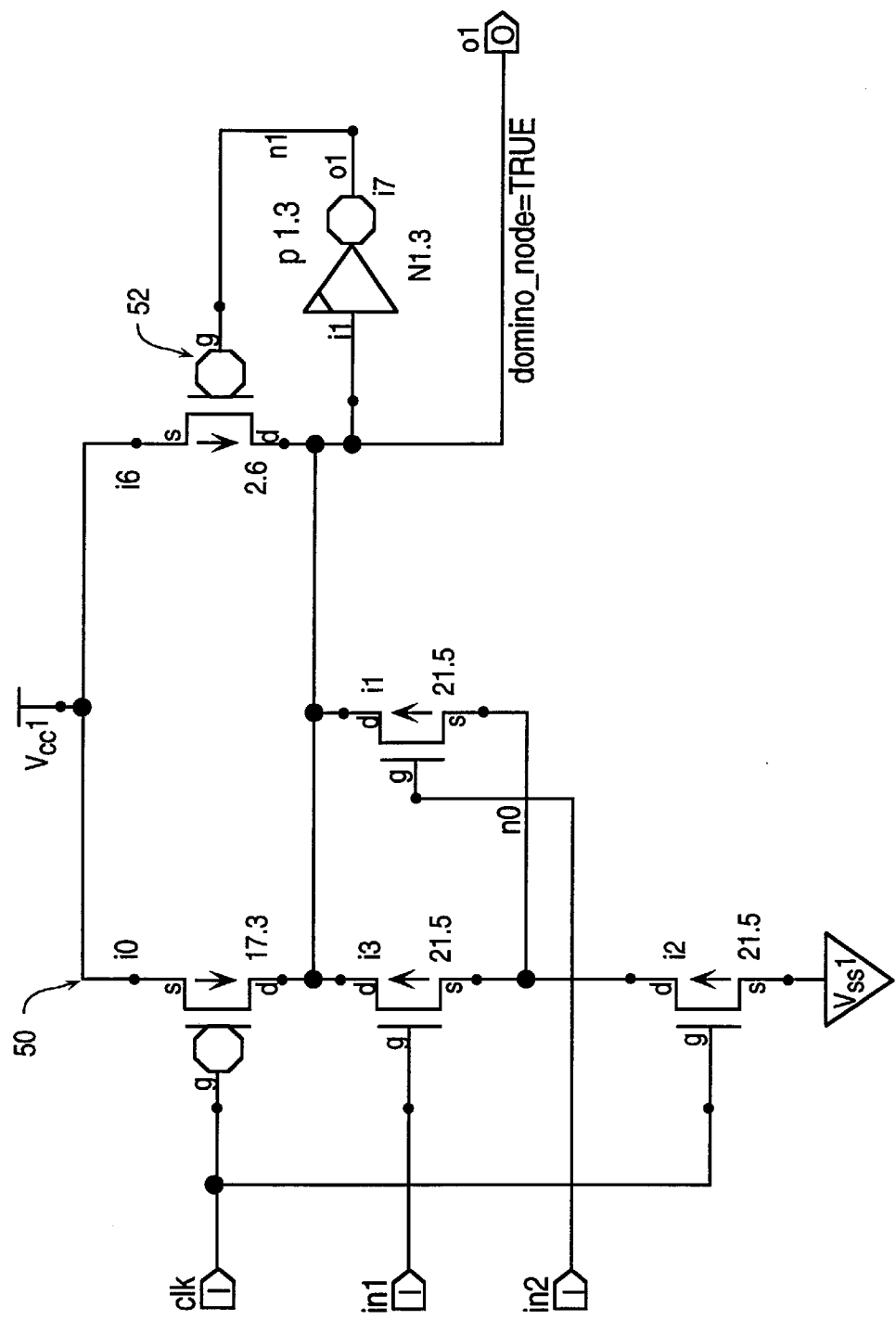
FIG. 1b is a circuit schematic of a clocked domino logic NOR gate configured in accordance with the prior art.

In accordance with one aspect of the invention, power reduction within a domino logic circuit is achieved by exploiting the fact that actual power consumption of a domino circuit during an evaluation phase depends upon the relationship between the actual input signal and the precharged state of the domino circuit. Within practical systems, input signals are not distributed randomly but are often biased significantly between different states, such as between a state of all binary zeros and a state of all binary ones. The foregoing considerations are exploited by analyzing representative input signals to a domino logic circuit to be configured and determining whether the representative input signals, on the average, are biased from random input signals. If so, the domino logic circuit is configured to precharge individual logic cells to states minimizing power consumption for the input signals most likely to be actually received.

In a domino circuit, no power is used during the evaluate phase, if the inputs are such that the output stays at its precharge value.

In one implementation, the foregoing method is applied to a 72-bit domino logic adder circuit. Analysis of representative input signals to a 72-bit adder circuit used for add operations in microprocessors reveals that input signals typically include numerous leading zeros. In other words, expected input signals to the adder circuit are not distributed randomly but are, instead, heavily biased towards a state wherein all bits are zeros. Accordingly, individual logic cells of the domino logic adder circuit are configured to achieve a power reduction for processing input signals comprised of all zeros over power consumed processing input signals composed of all ones. This is done by arranging the circuit such that for an input of all zeros, the outputs of a majority of the domino gates in the circuit retain their precharge value. For gates which retain their precharge value, no power is used during evaluate phase. As such, the domino logic adder circuit is configured to exploit the practical bias of actual input signals. This technique may be exploited in a wide range of other domino logic circuits such as multipliers, subtractors, filters and the like. Indeed, advantages of the invention may possibly be gained in any domino logic circuit receiving non-randomly distributed input signals.

In many cases, within domino logic circuits, it is the number of pairs of zeros or pairs of ones which affect the power consumption. By a pair of zeros or a pair of ones, it is meant that corresponding bit values of a pair of multiple bit input values are both zeros or both ones, respectively. For example, within a 72-bit adder, if $A_{13}$ and $B_{13}$ are both zero, then the two bits define a pair of zeros.

The foregoing technique is referred to herein as a "static" technique because the domino circuit logic unit, once configured, receives all input signals without further modification or control regardless of whether the input signals have numerous pairs of zeros or numerous pairs of ones. Therefore, actual power reduction, if any, during a particular logic operation depends upon the actual input signals. For example, the aforementioned adder may, from time to time, receive input signals comprised primarily of pairs of ones, requiring discharging of a large number of logic gates, resulting in significant power consumption. However, on the average, most input signals received by the adder will be comprised primarily of pairs of zeros such that relatively few of the individual logic gates of the adder will need to be discharged resulting in significant power reduction. Overall power reduction, if any, is only achieved when power consumption is averaged over numerous operations based upon numerous input signals.

In accordance with another aspect of the invention, "dynamic" power reduction is achieved within the domino logic circuit by analyzing individual input signals as received by the logic unit then controlling the logic unit to operate in a state which reduces power consumption in accordance with the specific received input signals. This power reduction technique is referred to herein as a dynamic technique because operation of the domino circuit logic unit is controlled dynamically based upon actual received input signals. The actual power reduction for each operation will depend upon the actual input signals received. Principles of the static technique described may also be exploited in domino circuit logic units configured in accordance with the dynamic technique.

In one embodiment, dynamic power reduction is achieved by analyzing input signals and configuring a domino logic unit to consume minimal power. An input signal analysis unit analyzes input signals and determines how to configure the domino logic unit to reduce power consumption, for example, by determining whether selected nodes of the configurable domino logic unit should be precharged or predischarged. In general, the domino logic unit is configured to ensure that the least number of domino logic cells evaluate. This may be achieved by connecting multiplexers to cells of the domino logic unit and controlling the precharge or predischarge state of the cells using the multiplexer.

In another embodiment, dynamic power reduction is achieved without requiring a configurable domino logic unit. Rather, input signals are analyzed to determine whether power consumption within the domino logic unit can be reduced by first modifying the input signals, perhaps by inverting the input signals. The input signals, whether modified or not, are then routed through the domino logic unit. If the input signals were first modified, then the output signal of the domino logic unit is corrected to yield a final output signal. If the input signals were not first modified, then no correction of the output signals is required.

In a specific example, a domino logic adder unit is provided for adding a pair of input signals, A and B, together along with an input carry value C. The logic unit includes a domino adder circuit configured for minimal power consumption upon the addition of input signals A and B, where A and B are both comprised of all pairs of zeros. The logic unit includes an input signal analysis unit which determines whether specific input signals A and B are comprised of primarily of pairs of zeros or primarily of pairs of ones. If comprised primarily of pairs of zeros, input signals A and B are routed through the domino logic circuit which operates to add A and B. The resulting intermediate value is combined with the input carry bit to yield a final output sum. If, however, input values A and B are determined to be comprised primarily of pairs of ones, then input signals A, B and C are each inverted. Inverted versions of signals A and B are routed through the domino logic circuitry resulting in an intermediate output value. The inverted carry bit is added to the intermediate output. The result is then inverted to yield a final output sum of value.

Hence, the domino circuit logic unit exploits the fact that $sum_n = A_n \oplus B_n \oplus C$ (where n is the bit number and C is a one bit carry) is equivalent to $\overline{sum_n} = \overline{A_n} \oplus \overline{B_n} \oplus \overline{C}$ where $\overline{sum_n}$, $\overline{A_n}$, $\overline{B_n}$ and C are the bitwise complements of sum, A, B and C.

By inverting input signals A and B when the signals are composed primarily of pairs of ones, the domino circuit receives input signals composed primarily of pairs of zeros. As noted, the domino adder circuit is configured to reduce power consumption for input signals composed primarily of pairs of zeros. In this regard, the domino adder circuit includes logic cells that are precharged or predischarged, as needed, to collectively minimize power consumption. Predischarging a cell means that the value of the output is set to 0, in the non-evaluated (normally called precharge) phase.

With reference to the remaining figures, exemplary embodiments of the invention will now be described. The exemplary embodiments are described primarily with reference to block diagrams and flowcharts. As to the flowcharts, each block within the flowcharts represents both the method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described.

A static method and apparatus for achieving power reduction within a domino logic unit will first be described with reference to FIGS. 2–4. Then, a dynamic method and apparatus for achieving power reduction will be described with reference to FIGS. 5–11.

FIG. 2a illustrates power consumption 100 within a domino circuit adder unit as a function of the percentage of ones within a pair of input signals for an adder circuit having the carry nodes of individual logic cells predischarged to 0, rather than precharged. It is noted that, since 0,0, or 1,1 primarily affects the propagation of carry signals in an adder, we can associate precharge (discharge) with the same carry node. As can be seen, the power consumption increases from a minimum power usage state where all input values are zero to a state wherein all input bits are one. FIG. 2b illustrates power consumption 102 within an adder circuit configured with the carry node of individual logic cells precharged. As can be seen, the power consumption is at its highest when all input bits are zero and at its lowest when all input bits are one. (FIGS. 2a and 2b both illustrate that power consumption varies linearly. Within actual adder circuits, power consumption may not vary linearly. Actual power consumption is, however, expected to typically vary monotonically. The linear power variation illustrated in the figures is merely provided to illustrate principles of the invention.)

FIG. 2c illustrates the distribution of input signals 104 within a practical 72-bit adder doing the add function for microprocessor. As can be seen, most input signals include a large percentage of pairs of zeros. Very few input signals include a large percentage of pairs of ones. By comparing the probability input signal distribution of FIG. 2c with the power distribution graphs of FIGS. 2a and 2b, it can be seen that it is desirable to utilize the adder of FIG. 2a to process input signals having a distribution of FIG. 2c because most addition operations will thus occur between input values requiring relatively modest power usage. If implemented using the adder of FIG. 2b, then most addition operations will occur between input values requiring significant power consumption.

Although described thus far with reference to an adder, similar principles may apply for other logic units as well, including multipliers, subtractors, comparators and the like. Of course, for other logic units, power consumption may not vary as to percentage of the numbers of pairs of zeros and ones, but may vary in accordance with other parameters. However, for many domino logic units, power consumption will vary in accordance with the relative percentages of pairs of zeros and ones within input signals. By pairs of zeros or ones, it is meant that corresponding bit values of a pair of multiple bit input values are both either zeros or ones. For example, within a 72-bit adder, if $A_{13}$ and $B_{13}$ are both zero, then the two bits define a pair of zeros. A pair of zeros will affect what percentage of domino cells implementing the carry will evaluate to 0 (and hence, consume power) because the carry generated on the right (lower bits) of the 0,0 pair will not propagate past the 0,0. If $A_{13}$ is zero but $B_13$ is one, then the two bits do not define a pair of zeros. Also, for other types of logic operations, the actual probability distribution of input values may differ from that shown in FIG. 2c. In some cases, a guassian distribution of input signals may occur. In general, however, within most domino logic circuits implemented within most computer systems, some correlation may be found between power consumption within the logic circuit and input signals such that a bias or variation in the distribution of the input signals from a random distribution can be exploited to achieve power reduction.

Figure 3:
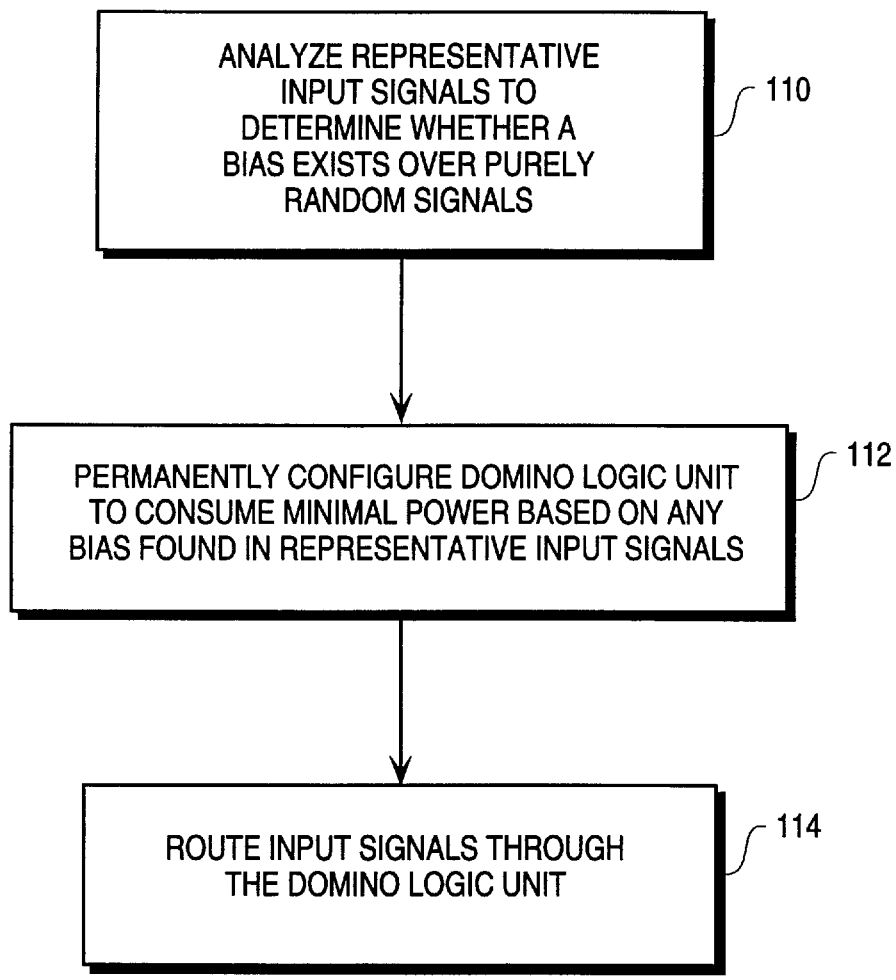
FIG. 3 is a flowchart illustrating a "static" method for achieving power reduction on the average within a domino logic circuit in accordance with the invention.

FIG. 3 illustrates a method for achieving a "static" power reduction within the domino circuit exploiting the principles thus far described. Initially, at step 110, representative input signals are analyzed to determine whether a bias exists within the input signals over purely random input signals. Next, at step 112, the domino logic unit is configured to exploit any bias within the input signals to achieve an average reduction in power consumption, perhaps by configuring the logic unit to have most logic cells precharged, rather than predischarged, or vice versa. More specifically, the domino logic unit may be configured to consume the least power for processing input signals having the highest probability of occurrence and to consume the most power of processing input signals having the lowest probability of occurrence.

The determination of step 110 is achieved in some cases merely by analyzing the system in which the domino logic unit is to be incorporated. For example, for a 72-bit domino adder unit to be incorporated within a microprocessor, an analysis of the operation of a typical microprocessor reveals that most numbers to be added by an adder will include numerous leading zeros. In other cases, it may be necessary or desirable to record numerous representative input signals within a practical system to determine whether a bias exists within the input signals and to quantify the bias.

Application of step 112, wherein the domino logic unit is configured to exploit any biasing input signals, differs depending upon the type of logic unit being developed. For a domino adder, it may be sufficient merely to configure the circuit to precharge, rather than predischarge, individual logic cells. For other logic cells, however, it may be necessary to precharge some logic cells, while predischarging others. In still other cases, it may be desirable to modify or rearrange circuit components to achieve power reduction.

Figure 4:
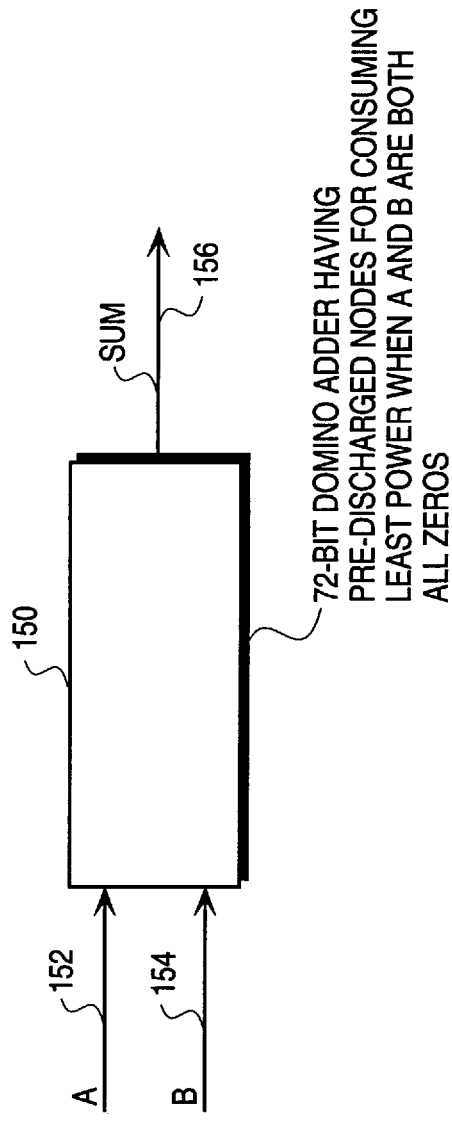
FIG. 4 is a block diagram illustrating a domino logic unit configured, using the method of FIG. 3, to achieve a time-averaged power reduction.

FIG. 4 illustrates a domino circuit adder unit 150 configured with individually precharged logic cells (not separately shown) for adding a pair of input binary numbers A and B received along lines 152 and 154 and generating a sum (A+B) for output along an output line 156. The logic cells of adder unit 150 are precharged, rather than predischarged, to exploit the presence of significant numbers of leading zeros within typical input values A and B which implies that many of the carry bits will be 0, and hence will stay at its predischarge state.

There might, however, be some instances where the inputs have, on an average, a higher percentage of ones than zeros. A typical case is a subtractor which is implemented using an adder circuitry.

For this case also, the circuit can be optimized for low power by using the relation $sum_n = A_n + B_n + C$ is equivalent to $\overline{sum_n} = \overline{A_n} + \overline{B_n} + C$. By having the adder permanently configured according to the second relation, if the inputs have a large percentage of ones then the actual inputs into the adder ($\overline{A_n}, \overline{B_n}$) are inverted and have a high percentage of zeros minimizing the average power consumed of the adder.

What has been described thus far is a static technique for achieving power reduction in a domino circuit wherein representative input signals are analyzed then the logic circuit is permanently configured to use the least amount of power for input signals having the highest probability of occurring and for consuming greater power only for input signals less likely to be received. In the following, dynamic techniques for power reduction will be described wherein individual input signals are detected and analyzed then components of the domino logic unit are controlled to achieve "on the fly" power reduction.

Figure 5:
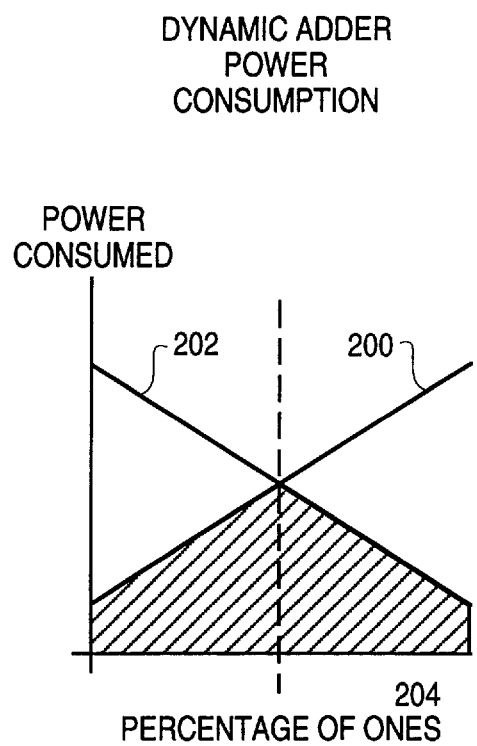
FIG. 5 is graph illustrating power consumption as a function of percentage of pairs of binary ones within a domino logic circuit capable of dynamically responding to input signals.

FIG. 5 illustrates a pair of power distribution curves superimposed in a single graph. More specifically, FIG. 5 illustrates a power curve 200 for a domino adder circuit configured with precharged logic cells and a power curve 202 for a domino adder circuit configured with predischarged logic cells both represented as a percentage of the number of pairs of ones within a pair of input signals to be added. Curve 200 corresponds to the curve of FIG. 2a and curve 202 corresponds to the curve of FIG. 2b. Curves 200 and 202 meet at a cross-over point 204. For any pair of input signals having a percentage of pairs of ones below that of cross-over point 204, it is preferable to employ the precharged logic unit corresponding to curve 200, rather than a predischarged logic unit corresponding to curve 202. Likewise, for any input signals having a percentage of pairs of ones greater than cross-over point 204, it is preferable to use the predischarge adder circuit rather than the precharged adder circuit. In the following, dynamic techniques are described which exploit the foregoing observation. In one example, individual input signals are analyzed then routed through one of two domino logic circuits which are precharged differently but otherwise perform the same logic operation. As will be described below, in some implementations, such as for an adder circuit, it is not necessary to use two separate duplicate domino circuits. Rather, it is sufficient to manipulate the input signals, perhaps by inverting the signals, to simulate the effect of having two separate domino circuits.

Figure 6:
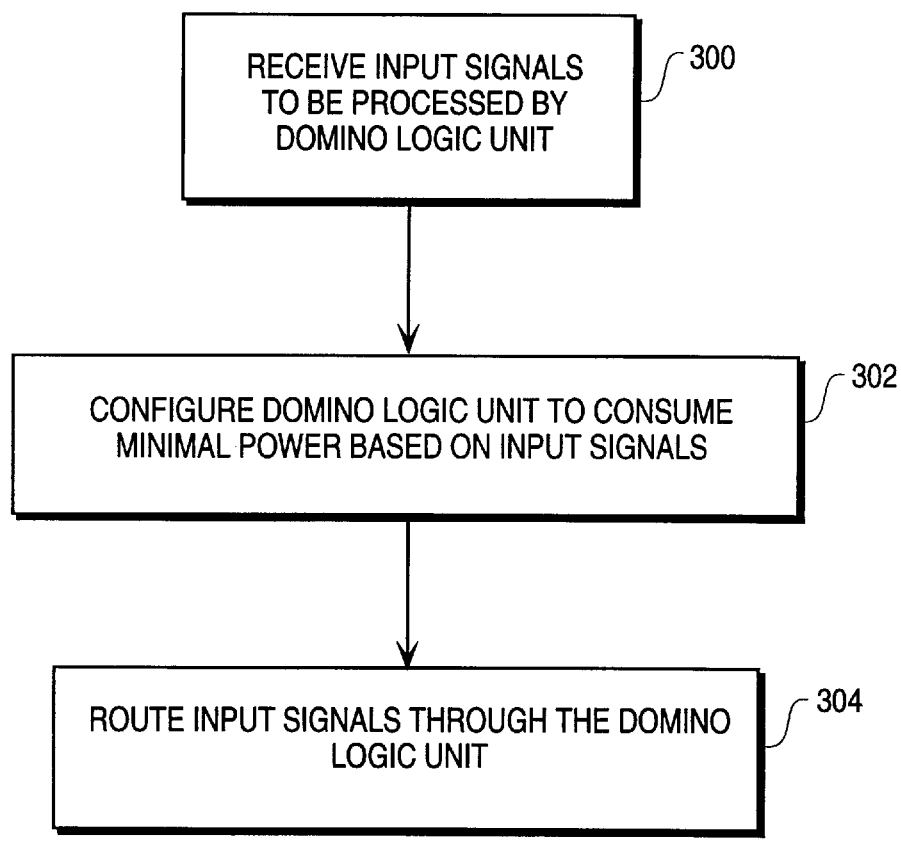
FIG. 6 is a flowchart illustrating a dynamic method for achieving power reduction within a domino logic unit having a configurable domino logic circuit.
Figure 7:
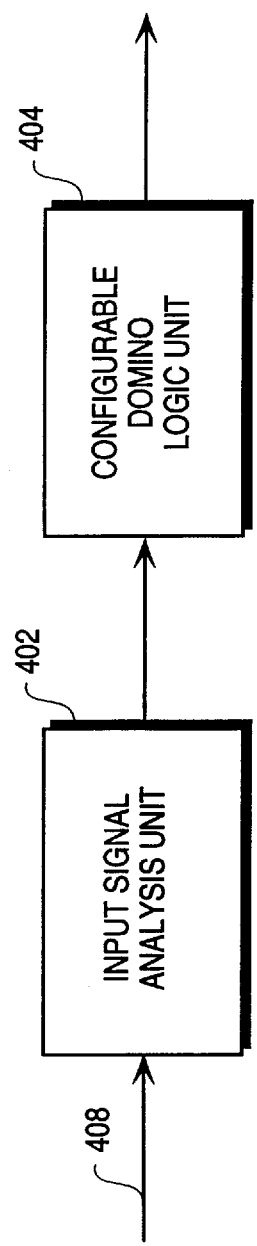
FIG. 7 is a block diagram illustrating a domino adder unit configured using the dynamic power reduction method of FIG. 6.

With reference to FIGS. 6 and 7, a dynamic power reduction technique will be described wherein input signals are analyzed and routed through a configurable domino logic unit. With reference to FIGS. 8–11, an alternative dynamic power reduction technique will be described wherein input signals are analyzed then modified, if necessary, to achieve power reduction within a non-configurable single domino logic unit.

FIG. 6 illustrates a dynamic method for achieving power reduction by routing input signals through a configurable domino logic unit. Initially, at step 300, input signals to be processed by the domino logic unit are received. At step 302, the received signals are analyzed to determine how to configure the domino logic unit to consume the least power. Step 302 may be performed by determining whether selected nodes of the domino logic unit are to be precharged or predischarged such that a least number of domino cells evaluate. Individual multiplexers may be connected to the cells of the domino logic unit for use in selectively precharging or predischarging the logic cells. Then, at step 304, the input signals are routed through the domino logic unit determined to consume the least power.

FIG. 7 illustrates an apparatus configured to perform the method of FIG. 6. More specifically, FIG. 7 illustrates a domino logic unit 400 having an input signal analysis unit 402 and configurable domino logic circuit 404. Input analysis unit 402 analyses the input signals received along an input line 408 and determines how to configure unit 404 (whether the same nodes are precharged or predischarged) such that it consumes less power.

In an exemplary implementation wherein domino unit 400 performs an add operation, domino circuit 404 may be configured with individual logic cells precharged or predischarged. Input analysis element 402 analyzes the input signals and configures the circuit such that least number of domino cells evaluate. For an adder, the above mentioned configuration may be achieved by simply inverting the inputs and outputs. Principles of the invention illustrated by the apparatus of FIG. 7 may be exploited with other logic units such as multiplexer, subtractors, comparators, etc.

Thus, FIGS. 6 and 7 illustrate a dynamic method and apparatus for reducing power consumption by employing a configurable domino logic unit. FIGS. 8–11 illustrate methods and apparatus for performing dynamic power reduction without requiring a configurable domino logic unit. Rather, input signals are analyzed and then modified, if necessary, to change the binary state of the input signals to values which will result in lower power consumption within a domino logic unit. The input signals are routed through the domino logic unit then corrected, if necessary, to yield a final output signal.

The foregoing "dynamic modification" technique will now be described with reference to the flowchart of FIG. 8 which describes a method for achieving dynamic power reduction within a domino adder configured to consume the least power for binary input values comprised primarily of zeros. Initially, at step 500, input signals to be processed are received. More specifically, input signals A (n-bits) and B (n-bits) and a carry (1 bit) signal C are received. Input values A and B may be multiple bit values such as 72-bit values. Carry value C is a single bit value. Next, at step 502, input signals A and B are analyzed to determine whether either the true or complement version of the input signals, when processed by the domino adder, will cause less power to be consumed. Because the domino adder is configured to consume the least power for input values composed primarily of zeros, the true version of the input signals will cause less power to be consumed if the input signals are composed primarily of zeros. The complement version of the input signals will cause less power to be consumed if the input signals are composed of primarily of ones. At step 504, the method of FIG. 8 branches based upon whether less power will be consumed using the true version or not. If the complement version of the input signals will result in less power consumption, then execution proceeds to step 506 where the input signals $A_n$ and $B_n$ and the carry signal C are all inverted to yield the ones compliment thereof. At 508, input signals $A_n$ and $B_n$ are routed through the domino adder to yield an intermediate sum. At 512, the resulting value is inverted to yield a final sum which is output at step 514. By inverting the input signals prior to processing by the domino adder for the case where the input signals are composed primarily of ones, the domino adder will therefore receive input signals composed primarily of zeros, resulting in relatively low power consumption.

If at step 504, it is determined that less power will be consumed by the domino adder using the true version of the input signals, then execution proceeds to step 516 where uninverted versions of the input signals A and B are routed through the domino adder to yield an intermediate sum. By routing the true version of the input signals to the domino adder when the true version contains predominantly zeros, low power consumption is achieved.

Figure 8:
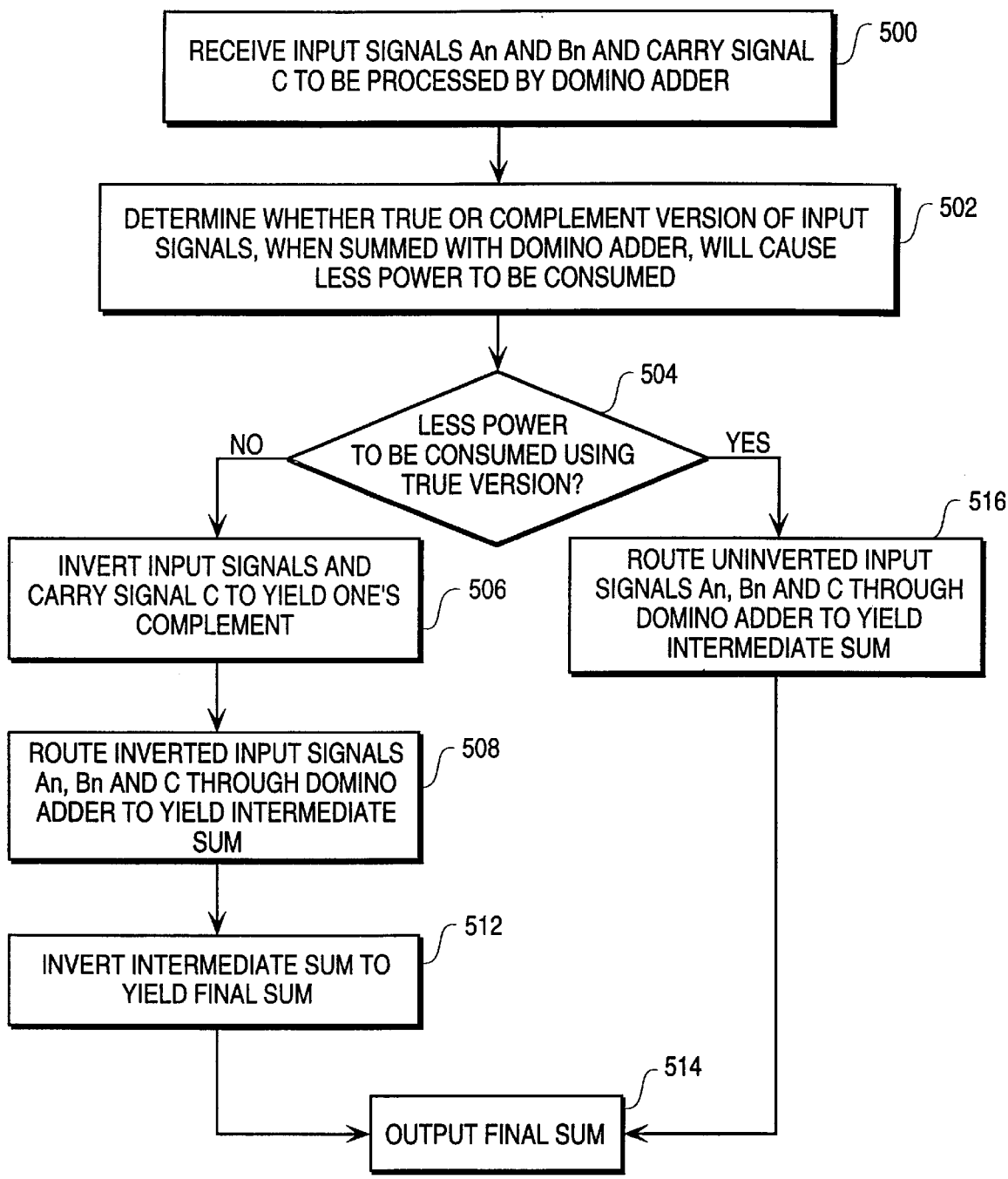
FIG. 8 is a flowchart illustrating a dynamic method for controlling a domino logic unit to achieve power reduction by first modifying input values to the domino logic circuit.
Figure 9:
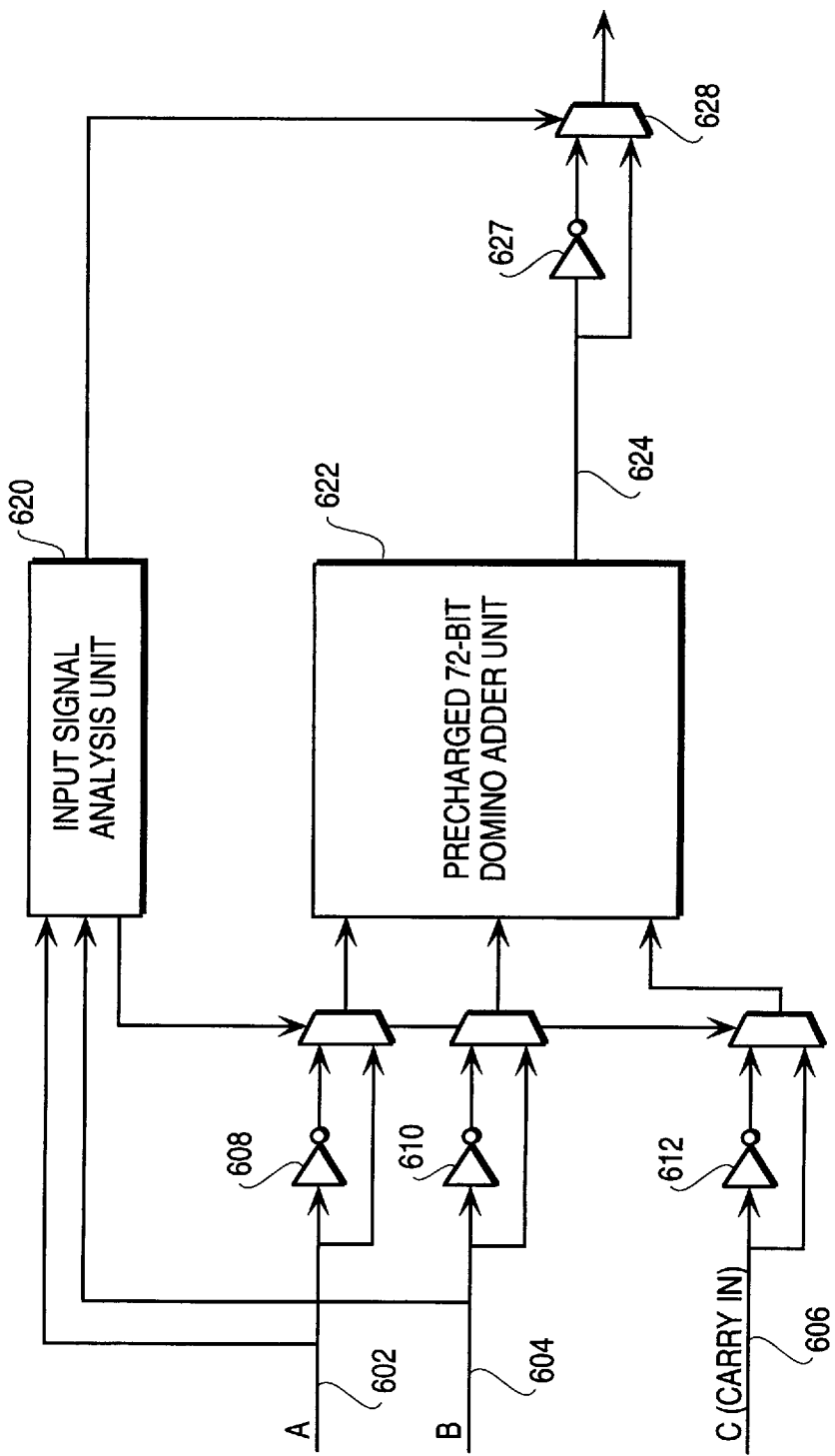
FIG. 9 is a block diagram, partially in schematic form, of a domino adder unit configured to achieve dynamic power reduction in accordance with the method of FIG. 8.

FIG. 9 illustrates an example of an apparatus configured to perform the method of FIG. 8. Input values $A_n$ and $B_n$ and a carry bit C are received along lines 602, 604 and 606, respectively. Each of input signals A, B and C are inverted by inverters 608, 610 and 612, respectively. A set of three multiplexers 614, 616 and 618 received inverted and non-inverted forms of signals $A_n$, $B_n$ and C, respectively.

Signals A and B are also routed to an input signal analysis unit 620 which analyzes the numbers of pairs of zeros and ones in the input signals and determines therefrom whether power savings may be achieved by using the inverted signals rather than the uninverted signals. If power savings can be achieved using the inverted signals, multiplexers 614, 616 and 618 are controlled to output inverted signals. The multiplexers are controlled to output the uninverted signals otherwise.

Output signals from multiplexers 614 and 616, representing signals A and B or their inversions, are routed to a domino adder circuit 622 which produces an intermediate sum signal along an intermediate line 624. The intermediate output signal is transmitted to an inverter 627 and to a fourth multiplexer 628. If inverted versions of signals A and B were initially selected for transmission to the adder circuit, then multiplexer 628 is controlled to select the signal output from inverter 627. Otherwise, multiplexer 628 selects the uninverted intermediate output signal. The apparatus of FIG. 9 exploits the fact that:

$$\text{sum}_n = A_n + B_n + C \tag{1}$$

is equivalent to $$\overline{\text{sum}_n} = \bar{A}_n + \bar{B}_n + \bar{C} \tag{2}$$

Assume that adder 622 is configured using equation (1), and the domino cells are arranged such that all the carry nodes inside the adder are predischarged to 0. If the input has a large percentage of (0,0) pairs then carry propagation will stop at those bits where there is a (0,0). Hence, in addition to bits which have a (0,0), many other bits will have their carry stay at the predischarged value of (0,0). Hence, less power is consumed.

If the adder is switched to configuration (2), then (1,1)'s will translate to (0,0)'s at the input of the adder. Hence, less power is spent if there are more (1,1)'s in the circuit.

Hence, FIG. 9 illustrates an adder apparatus wherein principles of the invention have been applied to achieve power reduction by modifying input signals to a domino logic circuit, then correcting the resulting signal, as appropriate, to yield a corrected output signal. Principles of the invention may also be exploited within other logic units such as multipliers, subtractors, comparators, filters, and the like. For other logic units, simple inversion of input signals may not be sufficient and a more elaborate modification of the input signals may be required and a more elaborate correction of output signals may be required. Nevertheless, particularly within complex circuitry, the advantages gained by employing domino circuitry, rather than conventional static CMOS circuitry, may outweigh the need to provide additional circuitry for analyzing the input signals and for modifying the input signals or reconfiguring the domino circuit.

In one particular embodiment, adder 622 is configured to perform addition using a carry lookahead circuit arrangement. This adder is both dynamically configured. It is fixed such that less power is consumed if there are more (0,0)'s.

Figure 10:
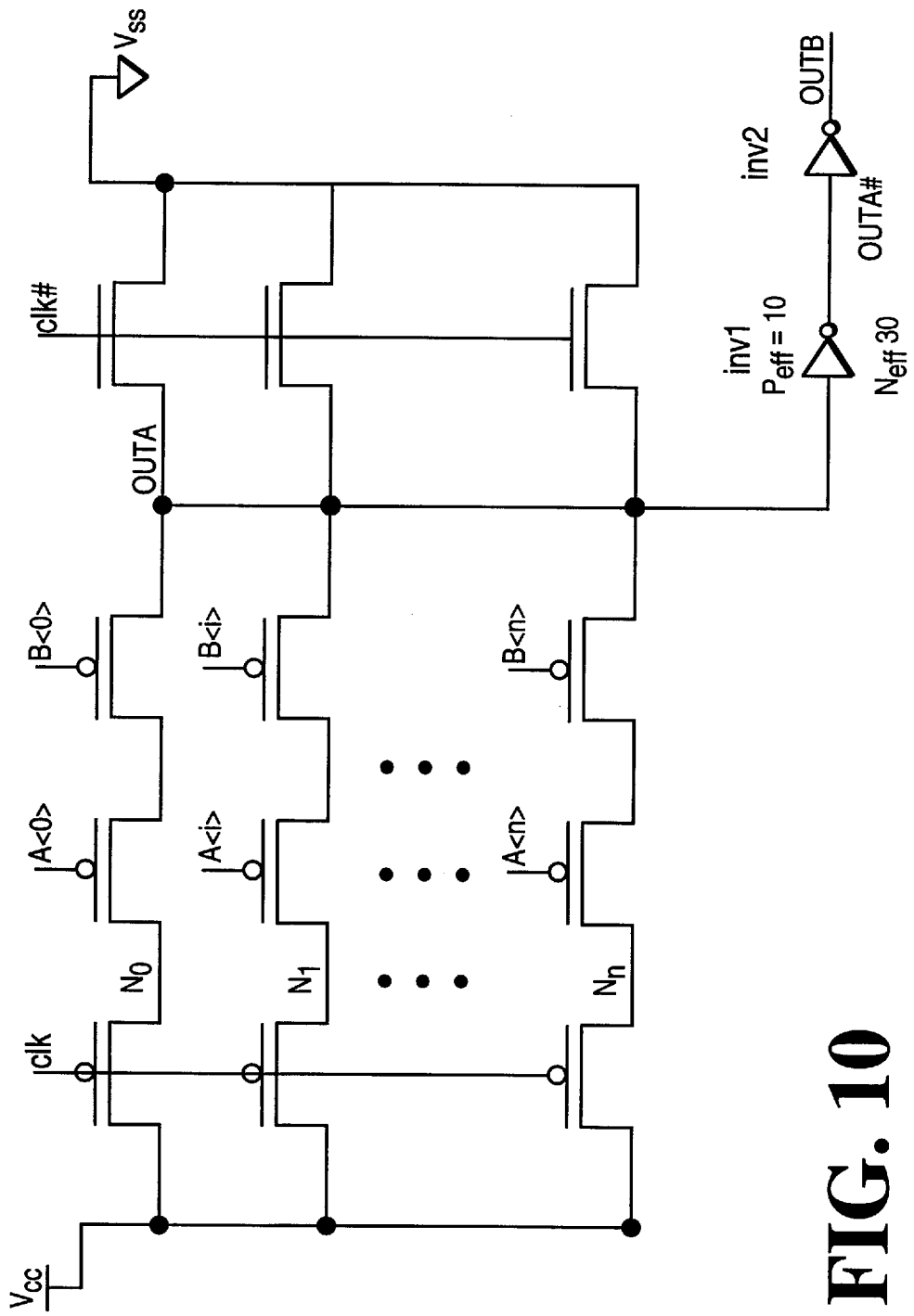
FIG. 10 is a circuit schematic of an input signal analysis unit of the domino adder unit of FIG. 9.

FIG. 10 illustrates a circuit for performing the functions of input signal analysis unit 620 for use with a carry lookahead adder.

FIG. 10 shows a circuit for estimating the percentage of (0,0) pairs in the input signals. When the clk is low (precharge), nodes $N_0, N_1, \ldots N_n$ will be charged to $V_{cc}$ (1) and node OUTA will be charged to $V_{ss}$ (0).

When clk goes to high during the evaluate phase, the transistors connected to clk and clk# will be turned off. For illustration, if we assume that A<0>=0 and B<0>=0, then the PMOS transistors connected to these signals will be on, and there will be a path between No and OUTA. Since initially, No=1 and OUTA=0, charge will be transferred from No to OUTA till the voltages are equal.

Hence, if more numbers of A<i>, B<i>=0,0, then more and more charge will be transferred to OUTA, and the voltage on OUTA will rise.

Inv1 is the inverter which senses the voltage on OUTA. It can be ratioed such that if 50% or more of A<i>, B<i>=0,0, then only OUTB goes to $V_{cc}$ (one).

Thus, the above-mentioned circuit can detect if the inputs contain a large number of zero pairs.

Figure 11:
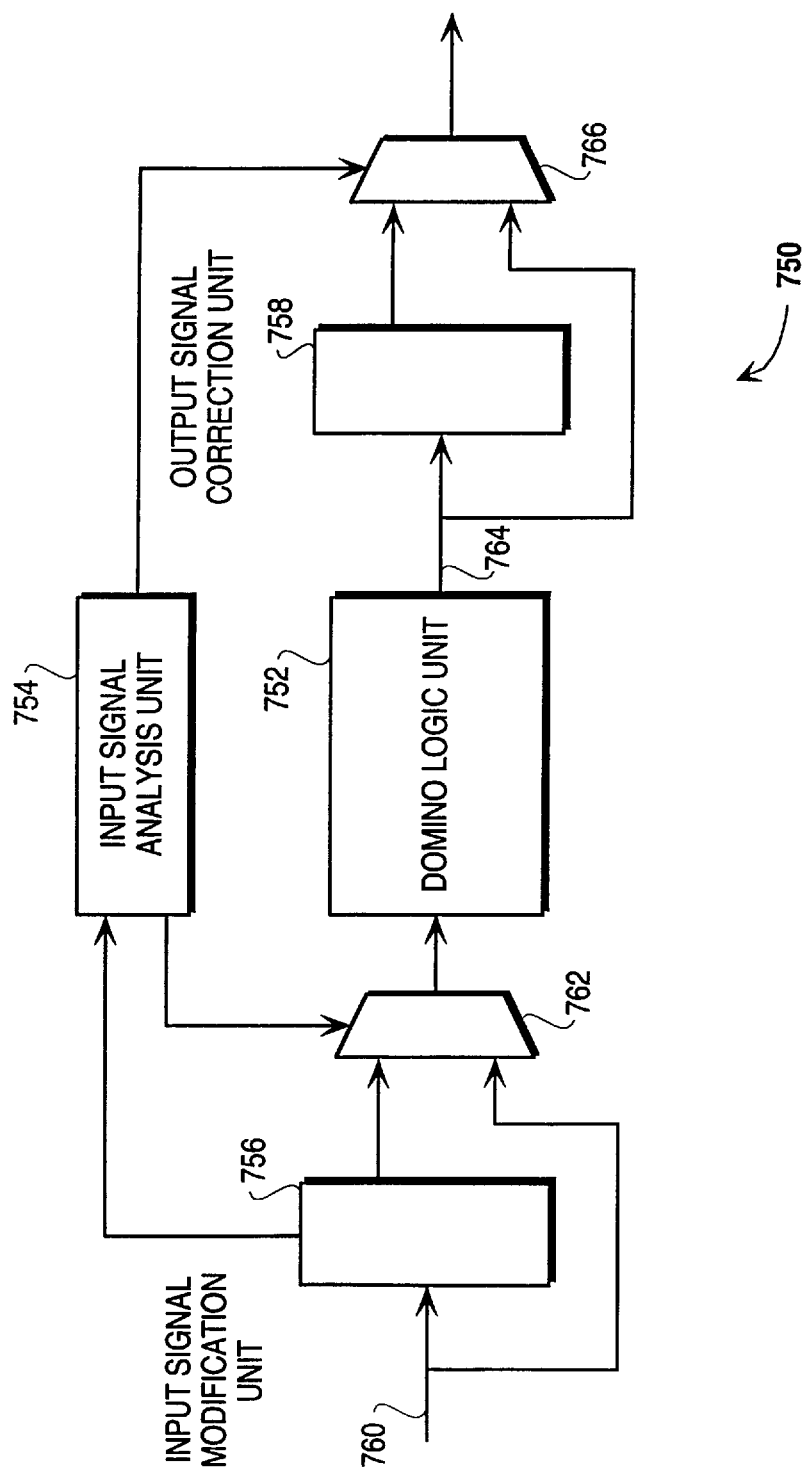
FIG. 11 is a block diagram of a general domino logic unit configured for dynamic power reduction and exploiting the method illustrated in FIG. 8.

Thus, FIGS. 9 and 10 illustrate a domino adder unit wherein input signals are inverted, if necessary, prior to routing through the domino adder unit then reinverted, again if necessary, to yield the final output value. FIG. 11 illustrates a generalized apparatus for performing dynamic power reduction by performing a modification of input signals prior to routing through a domino logic unit then correcting the output signal, if necessary. More specifically, FIG. 11 illustrates a domino logic unit 750 having a domino circuit 752, an input signal analysis unit 754, an input signal modification unit 756 and an output correction unit 758.

Input signals received along an input line 760 are routed to the input signal analysis unit which determines whether power savings may be gained by modifying input signals. Simultaneously, the input modification unit modifies the input signals, perhaps by inverting input signals. Analysis unit 754 transmits a signal to a multiplexer 762 which selects, for input to the domino logic circuit, either the input signal or the modified input signal. The domino circuit processes the receive signal, whether modified or not, an output and an immediate value along a line 764. Intermediate value is routed through the output correction unit 758. A second multiplexer 766 receives both the unmodified intermediate value and the corrected intermediate value. Analysis unit 754 transmits a selection signal to multiplexer 766 which selects the corrected signal if the modified signal is employed and selects the uncorrected signal otherwise.

In this manner, the advantages of dynamic power reduction are achieved while using only a single logic unit.

Thus, FIGS. 8–11 illustrate dynamic power reduction methods employing only a single domino logic unit.

What has been described are various techniques for achieving power usage reduction within domino logic circuits. By exploiting the characteristics of input signals either on an average basis or on a specific individual signal basis. Exemplary embodiments have been described herein for the purposes of illustrating and explaining principles of the invention. However, the principles of the invention may be exploited in a wide range of broader embodiments. Accordingly, the illustrative embodiments described herein should not be construed as limiting the scope of the invention.

What is claimed is:

1. An adder circuit to add a pair of binary numbers comprising:
    an analyzer to determine a number of pairs of zeros and a number of pairs of ones to be added within the pair of binary numbers;
    a selection unit to select the pair of binary numbers and a carry value if the number of pairs of zeros are greater than the number of pairs of ones, and to select an inverse of the binary numbers and an inverse of the carry value otherwise;
    a domino adder to add the selected values together to yield an intermediate sum; and
    a selector to select an inverted intermediate sum if the inverted binary numbers were selected and to select the intermediate sum otherwise.

2. The adder circuit of claim 1, further comprising:
    a first inverter for inverting the binary numbers and thereby generating inverted binary numbers;
    a first multiplexer having as inputs the binary numbers and the inverted binary numbers to select the binary numbers or the inverted binary numbers.

3. The adder circuit of claim 1, wherein the selector comprises a second multiplexer having as inputs the intermediate sum and an inverted intermediate sum;
    the multiplexer to select the output or the inverted output.

4. The adder circuit of claim 1, wherein the binary numbers comprise a first binary number and a second binary number, and wherein the analyzer comprises:
    a transistor pair comprising a first transistor and the second transistor having a source, a drain, and a gate, the transistor pair comprising the first transistor and the second transistor coupled in series between voltage and ground,
    the first transistor to have a gate voltage indicative of a first bit of the first binary number and the second transistor to have a gate voltage indicative of the first bit of the second binary number;
    the transistor pair repeated for each bit of the binary numbers; and
    outputs of the transistor pairs coupled to an output node, and the control signal determined based on the outputs of the transistor pairs.

5. The adder circuit of claim 1, wherein the analyzer is further to output a control signal, the control signal selecting the inverted binary numbers or the binary numbers, and the control signal further to control the selector.

6. A method for adding a pair of binary numbers together in a domino adder circuit, the method comprising:
    determining a number of pairs of zeros and a number of pairs of ones to be added within the pair of binary numbers;
    selecting the binary numbers and a carry value if the number of pairs of zeros are greater than the number of pairs of ones, and selecting an inverted binary numbers and the carry value otherwise;
    adding the selected values together to yield an intermediate sum; and
    inverting the intermediate sum to yield a final sum if the inverted binary numbers were selected and not inverting the intermediate sum otherwise.

7. The method of claim 6 wherein the step of determining a number of pairs of zeroes and the number of pairs of ones comprises determining a relative ratio of the pairs of zeroes to the pairs of ones.

8. The method of claim 7 wherein the step of determining a number of pairs of zeroes and the number of pairs of ones comprises:

indicating a pair of zeroes by a first voltage;

indicating a pair of ones by a second voltage; and evaluating the relative ratio by an overall output voltage.

9. The method of claim 7 wherein said step of selecting a number comprises the steps of:

generating a control signal based on the relative ratio; and using the control signal to select the binary numbers or the inverted binary numbers.

10. The method of claim 7 wherein the numbers added are selected to reduce power consumption of the domino adder circuit.

11. A method for adding a pair of binary numbers together in a domino adder circuit, the method comprising:

whether power consumption within the domino adder circuit will be greater by adding the pair of binary numbers or an inverse of the pair of binary numbers; and coupling either the pair of binary numbers or the inverse of the pair of binary numbers to inputs of the domino adder circuit.

12. The method of claim 11 further comprising:

inverting an output of the domino adder circuit if the inverse of the binary numbers was coupled to the domino adder circuit.

13. The method of claim 11, wherein the step of determining power consumption comprises:

determining a relative number of pairs of zeros and pairs of ones in the binary numbers.

14. The method of claim 11, further comprising:

generating a control signal based on the relative number of pairs of zeros and pairs of ones in the binary numbers; and coupling the binary numbers and the inverted binary numbers to a multiplexer having an output coupled to the domino adder circuit; and using the control signal to select the binary numbers or the inverted binary numbers as outputs of the multiplexer.

15. The method of claim 14, wherein if the relative number of pairs of ones is greater than the relative number of pairs of zeros power consumption is lower by adding the inverted binary numbers.

16. The method of claim 14, wherein the control signal is used to select an output of the domino adder circuit or an inverted output of the domino adder circuit.

17. The method of claim 14, further comprising the steps of:

inverting an output of the domino adder circuit; and selecting the output of the domino adder circuit or an inverse of the output of the domino adder circuit based on the selection signal.

18. The method of claim 14, wherein the output is inverted if the binary numbers were inverted.

19. The method of claim 11, wherein the numbers producing a lower power consumption are coupled to the domino adder circuit.

20. The method of claim 11, further comprising the steps of:

inverting the pair of binary numbers; and selecting the binary numbers or the inverse of the binary numbers based on a selection signal.

21. The method of claim 20, wherein the selection signal is generated in response to determining the power consumption, and the selection signal selects the numbers with a lower power consumption.

* * * * *

UNITED STATES PATENT AND TRADEMARK OFFICE
CERTIFICATE OF CORRECTION

PATENT NO.    : 5,880,986
DATED         : March 9, 1999
INVENTOR(S)   : Dedhia

It is certified that error appears in the above-identified patent and that said Letters Patent is hereby corrected as shown below:

Column 13,
Line 18, delete "whether" and insert -- determining whether --.

Signed and Sealed this

Twenty-fifth Day of November, 2003

JAMES E. ROGAN
*Director of the United States Patent and Trademark Office*